United States Patent [19]
Hendry et al.

[11] 3,909,497
[45] Sept. 30, 1975

[54] SOLID POLYMERS THERMALLY DEGRADABLE TO FLOWABLE COMPOSITIONS

[75] Inventors: Dale G. Hendry, Menlo Park; Marion E. Hill, Palo Alto, both of Calif.; Howard M. Peters, Falls Church, Va.

[73] Assignee: Stanford Research Insitute, Menlo Park, Calif.

[22] Filed: Apr. 12, 1974

[21] Appl. No.: 460,379

[52] U.S. Cl. ........ 260/77.5 A; 260/2 N; 260/47 CB; 260/47 EC; 260/47 R; 260/75 N; 260/77.5 AT; 260/77.5 AQ; 260/77.5 CH; 260/78 S; 260/78 SC; 260/78 R; 260/80 R; 260/80.3 R; 260/83.5; 260/86.1 N; 260/DIG. 43; 149/19
[51] Int. Cl.² .......................................... C08G 18/00
[58] Field of Search ............. 260/78 S, 78 SC, 78 R, 260/77.5 AQ, 77.5 AA, 77.5 A, 77.5 CH, 75 N, 2 N, 77.5 D, 83.5, 77.5 AT, 47 CB, 47 EC, 47 R, 80 R, 80.3 R, 86.1 N.DIG. 43; 149/19

[56] References Cited
UNITED STATES PATENTS

| | | | |
|---|---|---|---|
| 3,332,926 | 7/1967 | Baron et al. | 260/DIG. 43 |
| 3,345,352 | 10/1967 | Baron et al. | 260/DIG. 43 |
| 3,763,129 | 10/1973 | Sheppard et al. | 204/159.23 |
| 3,784,527 | 1/1974 | Sayigh et al. | 260/78.5 T |

OTHER PUBLICATIONS

Taylor, Chemical Technology, Sept., 1973, pp. 552–559.

*Primary Examiner*—M. J. Welsh
*Attorney, Agent, or Firm*—Donovan J. DeWitt

[57] ABSTRACT

A synthetic polymeric solid contains heat-sensitive groups which cleave at a temperature substantially lower than that at which thermal degradation would occur in their absence. Cleavage is effected essentially in the absence of materials reactive with the resulting molecular fragments, which are of such kind, size and number as to constitute a liquid composition. Such polymers have a variety of uses, such as binder components of salvageable propellant charges, heat strippable adhesives, degradable potting compositions, etc. The degradation products are useful in their own right as adhesives, plasticizers, fillers, etc. The invention conserves resources and avoids pollution.

10 Claims, No Drawings

SOLID POLYMERS THERMALLY DEGRADABLE TO FLOWABLE COMPOSITIONS

ORIGIN OF INVENTION

The present invention was made in the course of or under contracts with the U.S. Department of the Navy.

BACKGROUND OF THE INVENTION

It is well known that organic polymers can be degraded by several different methods, including thermal degradation or "cracking." The temperatures required to effect thermal degradation of many polymers are relatively high and cleavage is often not restricted to one particular type of bond or group in the polymer chains. Consequently, the products of thermal degradation are commonly of mixed character, i.e., gases (including monomers), condensible volatiles (liquids) and ill-defined non-volatile residues. Thus, with some exceptions — notably polyolefins, analogous to some petroleum hydrocarbons — the controlled production of useful, liquid degradation products with only minor amounts of off gases and negligible amounts of tars has not been proposed.

Many actual or potential applications of degradable polymers have been mentioned in the open literature or patented. Some three hundred references were listed by T. J. Taylor in a recent article entitled "Polymer Degradation: Some Positive Aspects" (Sept. 1973 issue of Chemical Technology).

Thermal cleavage of polymer chains is involved in several types of plastic waste processing, such as pyrolysis, carbonization, incineration and depolymerization.

Free radicals are apparently involved in the thermal scission of most types of polymer chains and it is known art to employ free radical source materials to facilitate cleavage. For example, German Pat. No. 1,299,880 (Ch. Abs. 71, 71169 p) is directed to a process in which a polyolefin, such as polybutene-1, is reduced in molecular weight by heating it in a hydrocarbon solvent containing an azo compound, such as azobisisobutyronitrile — a well known radical polymerization catalyst.

U.S. Pat. No. 3,784,527 teaches soluble polymers comprising pendant radiation (thermal and light) sensitive phenylsulfonylazide groups and pendant carboxyl groups. When the polymers are applied to hydrophobic substrates (e.g., polyethylene) and irradiated, decomposition of the sulfonylazide groups provides bonding to the substrate and the carboxyl groups provide hydrophilicity and basic dyestuff reactivity. No chain scission is involved and insolubilization results.

U.S. Pat. No. 3,763,129 teaches polyazo-compounds thermally decomposable to azo-containing free radicals. These are reacted in situ with vinyl monomers to form azo-containing polymers. The latter in turn are thermally decomposed (at higher temperatures) in the presence of different vinyl monomers to form block copolymers. The process of this patent involves thermal degradation of polymers comprising heat-sensitive groups, but only as sources of polymeric radicals and only in the presence of monomers reactive with those radicals.

In the so-called Guillet system, plastics are made degradable by incorporation of small proportions of ketone groups. However, degradation is due to U.V. sensitivity, not thermal instability and results in embrittlement upon prolonged exposure to sunlight.

It has not previously been proposed to incorporate thermally sensitive groups within the structure of a solid polymer or that the kind, size and number of fragments resulting upon scission could be closely controlled to give a flowable product of desirable solubility characteristics. Nor has it previously been apparent that a thermoset polymer otherwise suitable to be formed as a binder component in a propellant or munitions charge could be designed to controllably degrade to a free flowing liquid at a temperature intermediate of the maximum specified service temperature and the maximum safe temperature for that charge.

The desirability of solid polymers having the utilities of conventional polymers but also being controllably degradable to liquids by heating is evident. However, the difficulties involved in designing such a polymer are also evident to those skilled in the art. How does one ensure that the products resulting from degradation of any given polymer will constitute a liquid (or at least a relatively low melting solid)? Whether a given material is a liquid or solid depends on a variety of inter-related factors, such as the kinds, sizes, configurations and numbers of different molecular species present. The properties of a solid which determine its suitability for a contemplated use also depend on those same factors. So also do said factors determine the reaction conditions, the compositions and relative amounts of reactants and the reaction sequences which must be employed to prepare a given polymer. It is relatively easy to ensure that the degree of polymerization or cross-linking resulting from reaction of a given monomer, oligomer or prepolymer will result in formation of a solid polymer. It is, however, more difficult to say which specific bonds in the "giant molecules" (or molecule) of a given solid polymer should be cut to produce a liquid. Finally, there is the problem of how to do the cutting so that scission of only the selected bonds will result.

Many polymer uses require properties that can only be provided by thermoset polymers. It is a primary object of the present invention to provide polymers which have the advantageous properties of thermoset polymers but can also be converted at will to flowable compositions, simply by heating. Thermoplastic polymers inherently are convertible to flowable (or at least softened) compositions, simply by heating. However, it is also an object of the present invention to provide thermoplastic polymers which are thermally degradable to lower molecular weight thermoplastics at temperatures substantially lower than those required to effect degradation of conventional polymers of comparable composition.

A further object of the invention is to provide a method for making solid polymers which can be controllably degraded to flowable compositions by heating.

Another object of the invention is to provide an article of manufacture comprising a shaped member consisting essentially of the novel polymers described herein.

Yet another object of the invention is to provide a method of converting solid polymers in situ to flowable compositions.

SUMMARY OF THE INVENTION

It has now been found that heat sensitive groups can be incorporated at selected points in skeletal components of solid polymers so that scission will occur selectively at enough of those points to produce flowable compositions when the polymers are heated. Such polymers are prepared by the action of a curing agent on a resin which is not fully cured, either or both of which contain heat sensitive groups at skeletal segments.

Such heat sensitive groups comprise two adjacent atoms which, together with a covalent bond between them, constitute a link in the backbone of the resin or curing agent molecule. The group comprising this link is so composed that the bond between the two atoms will be substantially weaker than any other type of bond between skeletal atoms in the resultant polymer.

The presence of additional heat sensitive groups in pendant portions of reactant (resin or curing agent) molecules is optional and may be desirable in some instances as a further means of effecting molecular weight reduction, debranching, etc. upon degradation of the polymer.

The number and spacing of heat sensitive groups in the polymer skeleton is determined by the nature and arrangement of the monomer units of which it is comprised and by the requirement that the mixture of scission fragments constitute a flowable composition.

The interdependency of the preparation, composition and degradation aspects of the present invention is made evident by the following definition:

A process for forming a flowable composition in situ by thermal degradation of a solid polymer, said process comprising:

1. providing a solid polymer formed by the action of heat, radiation or a chemical curing agent on a resin which is not fully cured, said agent or said resin or both containing a plurality of heat-sensitive skeletal segments, the composition of said segments in said polymer being such that at least half of those present at any time will have been cleaved after 1 hour at a temperature $T_D$ at which essentially all other chemical bonds in said polymer remain unbroken after 1 hour, 2. heating said polymer, at a temperature ($T_H$) which is not higher than $T_D$, until the polymer is degraded to a mass which is flowable at or below $T_D$, said polymer being formed at a temperature less than $T_D$, and said heating being carried out essentially in the absence of any material reactive with said mass.

In the embodiment of the invention of most practical or commercial interest, the solid to be degraded constitutes a shaped member of an article of manufacture (e.g. as a binder matrix in a munitions charge or as a layer of a heat activated adhesive source material on a box flap).

A preferred version of the latter embodiment includes as an additional step forming the shaped member, either in situ by curing of a pre-shaped, uncured resin or by shaping of a pre-formed mass of the solid.

In another preferred version of the above embodiment the article of manufacture comprises other elements in addition to the shaped polymeric solid and the flowable composition resulting from the degradation of the solid is dissolved in a non-solvent for the other members and separated. This version is of importance as affording a safe method for processing of obsolete, over-aged or rejected ("off spec.") munitions.

In yet another embodiment of the invention, the solid is a thermoplastic polymer which is molten (or at least softened) at a temperature $T_H$ (as above defined) and upon degradation yields a composition which is flowable at — or preferably below — $T_H$. In this embodiment, neither the resin or the curing agent (if coreactive) will comprise any appreciable proportion of molecules expected to form cross-links, since cross-linking necessarily is to be minimized.

The intended scope and meaning to be given each of the terms "resin" and "curing agent" are made clear hereinafter.

DETAILED DESCRIPTION OF THE INVENTION

The key concepts of the invention are:
1. To select a solid polymer which meets two requirements:
    a. the properties of the polymer make it suitable for the application(s) contemplated, and
    b. the polymer can be made from reactants comprising a small proportion of heat sensitive skeletal segments and under conditions such that the heat sensitive groups are essentially stable;
2. To select one or more species of heat sensitive groups which meet three requirements:
    c. the groups can be incorporated in a controlled manner in one or more of the precursor materials from which the polymer will be derived,
    d. the groups are essentially stable at the maximum service temperature contemplated for the polymer, and
    e. the groups cleave at a substantial rate at a temperature which is greater than the maximum service temperature but substantially below the temperature at which any thermally induced scission would occur at an appreciable rate in the absence of said groups;
3. To distribute the selected heat sensitive groups in the precursor material(s) in such proportions and manner that the fragments resulting from cleavage of the groups will constitute a mass which is flowable at or below the temperature required to effect cleavage at a desired rate.

The utility of the invention in all applications resides in the fact that the polymer materials can first be shaped and emplaced as or in a given article as a solid having one set of properties and later — at will — converted in situ to a flowable mass having a different set of properties. In one application it will be desirable that the polymer degrades to a liquid which flows freely under its own weight at ambient conditions. In another application, it will be essential that the polymer degrades to a very viscous or sticky mass that will flow only under pressure and at an elevated temperature. In yet another application it will be essential that the solid polymer is insoluble (cross-linked) and the degraded polymer is soluble (in at least one solvent).

In general, the proportion of heat sensitive groups required will be such that their presence will not greatly affect the properties of the polymer otherwise. Thus, considerable guidance in selecting an uncured resin and a curing agent is afforded by what is already known about the dependency of properties of polymers on the kinds, relative amounts and manners of combination of the molecules from which they are derived.

Conventional methods of synthetic organic chemistry are employed in the practice of the present invention to incorporate the requisite heat-sensitive groups in the polymer precursor materials.

The thermal properties of a large number of polymers of various types are known. For example, Section VI of Polymer Handbook; Interscience, 1966 — incorporated herein by reference — gives physical constants for eight of the most important commercial polymers. Section V, pages 1–4, (also incorporated herein by reference) gives activation energies of degradation calculated from observed degradation rates of about 75 polymers over one or more temperature ranges each. Section V, pages 5–11, (also incorporated herein by reference) lists kinds and relative amounts of degradation products obtained at various temperatures from such polymers. The latter two types of data are indicative of the relative thermal stabilities of the various bonds cleaved in the degradation of nearly all polymers which do not include abnormally heat sensitive groups.

Thermal stability is but one of several properties which will often be checked for any polymer — new or old — which is being considered for a given application. If necessary, the rates of degradation at one or more temperatures can readily be determined by well known procedures. Time and temperature dependence of stability is conveniently expressed — as in the preceding definition of the invention — in terms of half-life temperatures. That is, the time required for half of the material to degrade at a given temperature or the temperature required for half the material to degrade in a given time are alternative modes of expression.

The 1 hour half-life temperature that a given type of heat-sensitive group will exhibit when incorporated in a contemplated polymer can be estimated from appropriate data for model compounds containing such a group. By appropriate data is meant 1 hour half-life temperatures obtained experimentally, reported in the literature as such or calculated from degradation rates reported for or obtained at other temperatures. For the purposes of the present invention, half-lives can be calculated with sufficient accuracy by using the Arrhenius equation: $k = Ae^{-E_a/RT}$, where $k$ is the specific rate constant, $R$ is the gas constant, $T$ is the absolute temperature, $E_a$ is the energy of activation for the reaction and $A$ is the "pre-exponential constant" or "entropy term." If $k_1$ denotes the rate constant at an initial temperature $T_1$ and $k_2$ the rate constant at a higher temperature $T_2$, then $k_2/k_1 = Ae^{-E_a/RT_2}/Ae^{-E_a/RT_1}$. $A$ cancels out and the relationship can be restated as $$ln\left(\frac{k_2}{k_1}\right) = \frac{E_a}{R}\left(\frac{T_2-T_1}{T_1T_2}\right) \text{ or } \log\left(\frac{k_2}{k_1}\right) = \frac{E_a}{2.303R}\left(\frac{T_2-T_1}{T_1T_2}\right).$$

Thus, if the specific rate constants for the reaction at each of two different temperatures are known, $E_a$ can be calculated. If $E$ is assumed constant over the temperature range involved, the specific rate constant at any other temperature can be calculated. Assuming that the degradation (cleavage) is kinetically of first order, the half-life time $t_{1/2}$, corresponding to a given value of $k$ is independent of the concentration of the heat-sensitive groups and $$t_{1/2} = \frac{ln2}{k} = \frac{2.303 \log 2}{k} \text{ or } t_{1/2} = \frac{0.693}{k}.$$

If the entropy factor $A$ is predictable, then $E_a$ can be determined from the rate constant, $k_1$ found at a single temperature, $T_1$. If both $A$ and $E_a$ are known or predictable for a given heat-sensitive group (in known or "model" compounds), then $k$ (or $t_{1/2}$) is directly calculable for any selected temperature and an Arrhenius line (plot of log $k$ versus 1/T) can easily be constructed.

The chemical literature includes data on decomposition rates, relative stabilities, etc. for several types of chemical groups. For example, the Encyclopedia of Polymer Science and Technology (Interscience, 1966), Vol. 2, (pp 279–293, incorporated herein by reference) gives decomposition rates and temperatures for many free radical-initiating azo compounds.

Values of $E_a$ and $A$ are given for many azo compounds in Comprehensive Chemical Kinetics, Vol. 5, Chap. 5, (Part 1, incorporated herein by reference), Elsevier; Amsterdam, 1972. $E_a$ and $A$ values are also given for esters (including carbonates) in Chapter 4, part 2, (also incorporated herein by reference). Definitions of terms "curing," "chemical curing agent," and "a resin which is not fully cured" as used in the claims.

Curing, as used herein, means to convert a fluid or malleable resin, suitable for processing operations, by means of heat, radiation or a chemical agent, to a solid polymer having the physical properties of a finished product. (Pressure may or may not be employed).

The term, chemical curing agent means a compound which induces or enters into such a conversion and which may be employed alone or in conjunction with irradiation or heat. A chemical curing agent may either be co-reactive (including vulcanizing agents and chain extenders) or catalytic in its action. Modifiers, accelerators and activators may also be present. If a chemical curing agent is used in curing a resin comprising heat-sensitive skeletal segments, it is optional whether the chemical agent includes any heat-sensitive groups itself or whether the sensitive groups are in skeletal segments or pendant segments. However, if the resin does not contain heat-sensitive skeletal segments, then a chemical agent containing such skeletal segments must be used and the agent must react with the resin molecules to form links within or between the polymer chains.

Although the physical changes associated with curing will generally be the result of cross-linking between polymer molecules, end-to-end joining of polymer chains may partially or solely account for such changes. Curing may result from further reaction of the same kind that produced the uncured or partially cured resin or — particularly in the case of linear polymers — may be due to linking by a different type of reaction. Curing may also involve end-capping, i.e., extension of polymer chains by reaction with mono-functional molecules — which may or may not comprise heat-sensitive groups. In general, the capping moiety will have to be of sufficient size to effect a substantial increase in the molecular weight of the chain it attaches to. Otherwise an appreciable curing effect may not be realized.

The term, a resin which is not fully cured, as used herein, means a fluid or malleable mixture of molecules produced by one or more stages of polymerization and capable of being hardened, strengthened, or solidified by curing. This meaning embraces not only A and B stages of thermosetting polymers but also any preliminary or intermediate precursor compositions to thermoplastic end products, e.g., linear oligomers and prepolymers.

The resin to be cured may be a "pre-mix" of one or more polymers with one or more monomers and/or other polymers co-reactable with each other. In this case, thermal or radiant energy will generally be used to induce curing and at least one component of the mixture will provide heat-sensitive groups which will be comprised in skeletal segments of the final polymer. Optionally, the uncured resin may include such amounts of compatible non-polymeric materials as are not deleterious to the requisite properties of the end product — including its degradability to a flowable composition by heating.

"Polymer"

The present invention is not limited in its broadest aspects to any type of polymer or growth mechanism. That is, the invention embraces the preparation and use of both "condensation" and "addition" type polymers, whether formed by step-growth or chain growth and whether from vinyl or (poly) functional group monomers.

The only consideration as to polymer types or formation mechanisms are those occasioned by the necessity of incorporating heat-sensitive skeletal segments at some stage in the synthesis and by the temperature limits consequent upon introduction of said segments.

A linear, heat-sensitive polymer may "melt" or flow at a temperature substantially below the temperature at which cleavage of the heat-sensitive groups proceeds at an appreciable rate. Alternatively, a linear heat-sensitive polymer may degrade (to a melt) at a temperature substantially lower than the flow temperature it would exhibit in the absence of the heat-sensitive groups it contains. Both types of linear, heat-sensitive polymers are meant to be covered by the term "thermoplastic."

"mass which is flowable"

This term, as used herein, encompasses degradation mixtures ranging from compositions which are free flowing liquids at ordinary temperatures to those which will flow at $T_H$ (the temperature at which degradation is effected) only under the application of substantial pressures. (That the latter extreme constitutes a genuine limitation is made evident by comparison to thermoset resins which will not creep or flow under high pressures, even at elevated temperatures, unless first degraded.) Preferably, the degraded resin will have an absolute viscosity, at $T_H$, not in excess of 10,000 poise, i.e., it will exhibit a shear rate of 1 reciprocal second under a shear stress of 10,000 dynes/cm$^2$. (See pages 1–12; Paint Flow and Pigment Dispersion; Temple C. Patton; Interscience, 1964.)

"Heat-sensitive group"

For the purposes of the present invention, any group of two or more atoms meeting the three requirements set out in the preceding discussion of key concepts constitutes a heat-sensitive (H.S.) group.

A preferred type of H.S. group is one selected from the class consisting of (I) azo groups, (II) carbonate groups, (III) ester groups, and (IV) amine-oxide groups, each of said types of groups being defined as follows:

I is a divalent radical having one of the formulae

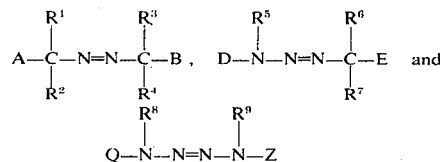

wherein, a. A and B independently are —CH=CH—, —CH$_2$—, —O—, —NH—,

phenylene or, when the adjacent —CRR— moiety is —CH$_2$—, may with that moiety constitute a cycloalkylene group of 3 to 8 carbons,
each or both of —CR$^1$R$^2$— and —CR$^3$R$^4$— may be

and each R radical, when not part of a carbonyl group, independently is H, —CN, fluoro C$_1$–C$_5$ alkyl, C$_2$–C$_5$ alkenyl, C$_5$–C$_6$ cycloalkyl, phenyl or tolyl, each of the latter hydrocarbyl groups being optionally substituted with a bromo, chloro, fluoro, cyano, C$_1$–C$_3$ alkoxy, C$_2$–C$_3$ alkenyloxy, dimethylamino or diethylamino group;

b. D independently is —CH$_2$—, —CH=CH— or phenylene, E independently is —CH=CH—, —CH$_2$—, —O—, —NH—,

phenylene or — where —CR$^6$R$^7$— is (—CH$_2$) — may with —CR$^6$R$^7$ — constitute a cycloalkylene group of 3 to 8 carbons, R$^5$ is H, methyl or ethy —CR$^6$R$^7$ is

or R$^6$ and R$^7$ independently are H, —CN, C$_1$–C$_5$ alkyl, C$_2$–C$_5$ alkenyl, C$_5$–C$_6$ cycloalkyl, phenyl or tolyl, each of the latter groups being optionally substituted with a bromo, chloro, cyano, C$_1$–C$_3$ alkoxy, C$_2$–C$_3$ alkenyloxy, dimethylamino or diethylamino group;

c. Q and Z independently are —CH$_2$—, —CH=CH—, or phenylene and R$^8$ and R$^9$ independently are H, methyl or ethyl;

with the reservations that no one carbon may be bonded to both oxygen and cyano, to two cyano groups or to more than one group selected from said cycloalkyl, phenyl or tolyl groups.

II is a divalent radical having the formula

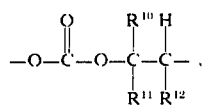

wherein $R^{10}$ and $R^{11}$ independently are H, methyl or ethyl and $R^{12}$ is —H, —NO$_2$,

—CN or —CX$_3$, X being chlorine or fluorine, III is a divalent radical having the formula

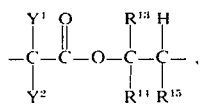

wherein $Y^1$ and $Y^2$ independently are H or Cl, $R^{13}$ and $R^{14}$ independently are H or methyl and $R^{15}$ is —H, —NO$_2$,

—CN or —CX$_3$, X being chlorine or fluorine, and IV is a divalent radical having the formula

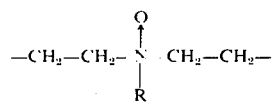

wherein R = CH$_3$ or C$_2$H$_5$.

Table I following gives 1 hour half-life temperatures for representative species of each of the preceding types of H.S. groups. These temperatures have been calculated from data obtained experimentally (for model compounds) or found in the literature. The temperature dependence of the decomposition rate of a given chemical grouping is not largely affected by the nature of substituents or bonds more than two or three atoms removed from and not conjugated with the heat sensitive co-valent bond. Accordingly, the temperatures given in Table 1 are expected to hold within a range of about ± 5°C for the vast majority of polymers in which such groups may be incorporated.

Table 1

| Type of Group | Structure | 1-hour half-life temp., ± ca. 5° |
|---|---|---|
| Esters | —CH$_2$—C(O)—O—C(CH$_3$)(H)—CH$_2$—C(O)—CH$_2$— | 250°C |
| | —CH$_2$—C(O)—O—C(CH$_3$)(H)—C(H)—CH$_2$— | 240 |
| | —CH$_2$—C(O)—O—C(CH$_3$)(H)—C(NO$_2$)(H)—CH$_2$— CH$_3$ CH$_3$ | 220 |

Table 1-Continued

| Type of Group | Structure | 1-hour half-life temp., ± ca. 5° |
|---|---|---|
| | —C(H)(Cl)—C(O)—O—C(CH$_3$)(H)—CH$_2$— | 220 |
| | —C(Cl)$_2$—C(O)—O—C(CH$_3$)(H)—CH$_2$— | 205 |
| Carbonates | —O—C(O)—O—C(CH$_3$)(H)—CH$_2$— | 275 |
| | —O—C(O)—O—CH$_2$—C(CN)(H)— | ~230 |
| | —O—C(O)—O—CH—C(CH$_3$)(CN)(H)— | ~220 |
| | —O—C(O)—O—CH$_2$—CH$_2$—C(O)—CH$_2$— | ~210 |
| | —O—C(O)—O—C(CH$_3$)(H)—CH$_2$—C(O)—CH$_2$— | ~200 |
| | —O—C(O)—O—C(CH$_3$)(H)—C(NO$_2$)(H)— | 190 |
| Azo compounds | —CH$_2$—C(CH$_3$)(H)—N=N—C(CH$_3$)(H)—CH$_2$— | 245 |
| | —CH$_2$—C(CH$_3$)$_2$—N=N—C(CH$_3$)$_2$—CH$_2$— | 180 |
| | —CH$_2$—N(CH$_3$)—N=N—N(CH$_3$)—CH$_2$— | 160 |
| | —C$_6$H$_4$—CH$_2$—N=N—CH$_2$—C$_6$H$_4$— | 160 |
| | cyclohexyl—C(CN)—N=N—C(CN)—cyclohexyl | 150 |
| | —CH$_2$—N(CH$_2$CH$_3$)—N=N—N(CH$_2$CH$_3$)—CH$_2$— | 145 |
| | —O—C(O)—C$_6$H$_4$—N(CH$_3$)—N=N—N(CH$_3$)—C$_6$H$_4$—C(O)—O— | 140 |
| | —C$_6$H$_4$—C(CH$_3$)$_2$—N=N—C(CH$_3$)$_2$—C$_6$H$_4$— | 130 |
| | —CH$_2$—C(H)(φ)—N=N—C(H)(φ)—CH$_2$— | 130 |

Table 1-Continued

| Type of Group | Structure | 1-hour half-life temp., ± ca. 5° |
|---|---|---|
| | —CH$_2$—C$_6$H$_4$—N—N=N—C—  with CH$_3$, CH$_3$, H, C$_6$H$_4$—CH$_2$ substituents | 110 |
| | —CH$_2$—C—N=N—C—CH$_2$— with CN, CN, CH$_3$, CH$_3$ substituents | 80 |
| Miscellaneous | —CH$_2$—CH$_2$—Hg—CH$_2$—CH$_2$— | 250 |
| | —CH$_2$—C—Hg—C—CH$_2$— with CH$_3$, CH$_3$, H, H substituents | 170 |
| | (bicyclic structure with H's) | 170 |
| | —CH$_2$—CH$_2$—N(→O)(CH$_3$)—CH$_2$—CH$_2$— | 120 |

U.S. Pat. No. 3,763,129, (columns 12, 13; incorporated herein by reference) lists 10 hour half-life temperatures for a variety of heat-sensitive azo compounds. 1 hour half-life temperatures for these compounds can be estimated by the rough rule of thumb that the rate of a reaction doubles for each 10° increase in temperature. For example, a compound having a half-life of 10 hours at 100°C will have a half-life of approximately 5 hours at 110°, 2½ hours at 120° and 1¼ hours at 130°. Thus the 1 hour half-life temperatures for the compounds listed in the patent will be approximately 30°C higher than the 10 hour half-life temperatures given.

"a temperature $T_D$"

As used herein, the term, a temperature $T_D$, means an elevated temperature at which the half-life of the heat-sensitive groups of the cured polymer is 1 hour or less and at which an otherwise, essentially identical polymer lacking the heat-sensitive groups remains essentially unchanged (upon being restored to ambient or room temperature) after 1 hour. That is, so few chemical bonds in the counterpart polymer are broken after 1 hour at $T_D$ that its essential character remains unchanged. Or, more directly, essentially no chemical bonds in the heat-sensitive polymer, other than the weakest bonds in the heat-sensitive segments thereof, will be broken after 1 hour at $T_D$. Experimentally, the properties of the degraded polymer remain essentially constant at temperature $T_D$ after all of the heat-sensitive groups have been cleaved (a period of about 4 to 5 half-lives). Alternatively, a polymer made as nearly identical to the heat-sensitive polymer as possible, but without the heat-sensitive groups, remains essentially unchanged after being heated to $T_D$, held at $T_D$ for 1 hour and cooled to ambient temperature.

Incorporation of heat-sensitive groups

It is apparent that heat-sensitive skeletal segments cannot be "inserted in" mono-olefinic monomers such as ethylene or vinylidene chloride or in mono-functional cyclic monomers such as ethylene oxide, ethylene imine or propylene sulfide. However, it is possible to attach heat-sensitive segments to such monomers. If the attached portion comprises no reactive functions, then the modified monomer will be monofunctional and can be incorporated in the cured polymer only by end-capping of main chains or as pendant groups. However, if the residue which will be detached upon cleavage of the H.S. group (bond(s)) is relatively large or if the proportion of the modified monomer in the cured resin is substantial, cleavage can correspondingly lower the flow temperature of the resin. "Insertion" of an H.S. group between the aromatic ring and vinyl group in vinyl aromatics, such as styrene, is synthetically feasible but the resulting drastic change in the character of the monomer must be taken into account.

H.S. groups can be inserted in small difunctional monomers such as ethylene glycol, ethanolamine or ethylenediamine. Since the H.S. group will necessarily comprise at least two additional backbone atoms, an appreciable change in the properties of such a monomer can be anticipated. However, so long as functional group inactivation does not result and other pertinent effects are predictable, the modified monomer can still be used in the practice of the present invention without ancillary experimentation. Such as H.S. monomer will generally constitute only a minor proportion of the final polymer and — particularly if it is employed only for cross-linking — will not ordinarily effect polymer properties other than heat sensitivity to any notable extent. Further, changes in the other properties of a monomer resulting from "insertion" of an H.S. group in its carbon skeleton may be advantageous in some applications. That is, the modified monomer can constitute a new monomer which can be evaluated (like any other new monomer) for applications in which service (and synthesis) temperatures will not be such as to cause cleavage of the H.S. group to proceed at an intolerable rate.

In general, it is preferred to incorporate H.S. groups in larger monomers, i.e., in monomers in which the functional groups are separated by four or more carbons. For the purposes of the present invention, molecules having at least one terminal or pendant functional group and consisting of low polymer segments joined by H.S. segments may also be regarded as H.S. "monomers."

The stage(s) in the synthesis of a polymer at which H.S. groups are introduced in the resin structure will depend — among other factors which will be apparent to polymer chemists — on the synthesis temperatures required at each stage. For example, elevated temperatures are employed in some procedures for the preparation of polyesters and polyamides, which may subsequently be linked together by use of suitable co-reactive chemical curing agents at much lower temperatures. It will also be recognized that the suitability of a candidate processing method, such as injection molding will depend in part on whether high local temperatures are developed in the mass of the H.S. resin being worked. Such limitations are all too familiar to those knowledgeable in the art of munitions manufacture.

There are two bodies of chemical knowledge that may be drawn upon in selecting methods of synthesizing heat-sensitive resins. The literature of organic chemistry in general includes a considerable amount of information on specific methods of synthesizing molecules comprising azo groups, tertiary amine oxides, β-keto esters and carbonates containing activated β-hydrogens, etc. Reference may be had to such works as Organic Syntheses (Wiley); Organic Reactions (Wiley); Wagner & Zook; Synthetic Organic Chemistry (Wiley); Houben-Weyl, Methoden Der Organischen Chemie (Georg Thieme, Verlag. Stuttgart; Volumes 5IIb, 7/2a, 10/1,2,3,4, 11 and 12) and Theilheimer, Synthetic Methods of Organic Chemistry (S. Karger, N.Y., N.Y.), plus numerous patents.

The literature of polymer chemistry in particular includes such works as The Encyclopedia of Polymer Science and Technology (Interscience, 1964–71); Brandop & Immergut, Polymer Handbook (Interscience, 1966) and Sorenson and Campbell, Preparative Methods of Polymer Chemistry, 2d. ed. (Interscience, 1968). The latter text contaiins 434 preparations of specific polymers of the following types: polyamides, polyureas, polyurethanes, polyesters, block condensation elastomers, high temperature polymers, miscellaneous condensation polymers, polyolefins, acetylenic polymers, diene polymers and copolymers, monoisocyanate polymers, polycarbodiimides, polymers of diazo compounds, poly-p-xylylene, norbornylene polymers, polyphenylene ethers, dimethylketene polymers, Diels-Alder polymers, polyisonitriles, polymers of ring opened carbocylics, phosphonitrilic chloride polymer and cross-linked epoxy resins, allyl resins, phenol/formaldehyde and urea/formaldehyde resins.

Exemplary methods of incorporating H.S. groups in curable resins, and/or chemical curing agents therefor, follow.

Incorporation of heat-sensitive moieties comprising azo groups

Polyamides

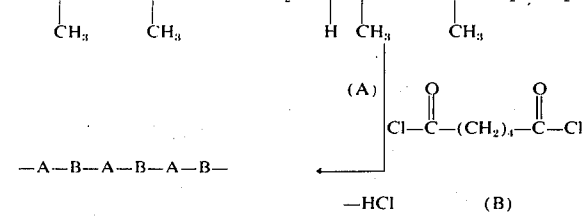

(A)

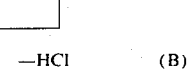

—A—B—A—B—A—B—

—HCl   (B)

Mixtures of the heat sensitive diamine (A) and hexamethylene diamine (C) can be used to vary the concentration of weak links in the polymer; e.g.,

A + 50/50 B/C → —A—B—A—C—A—B—A—C—

(idealized)

An alternative approach is to utilize amido N—H groups in a polyamide to effect cross-linking with an isocyanate terminated, heat sensitive azo compound:

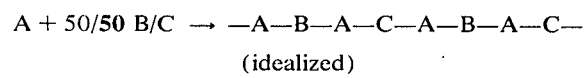

azobisisobutanol

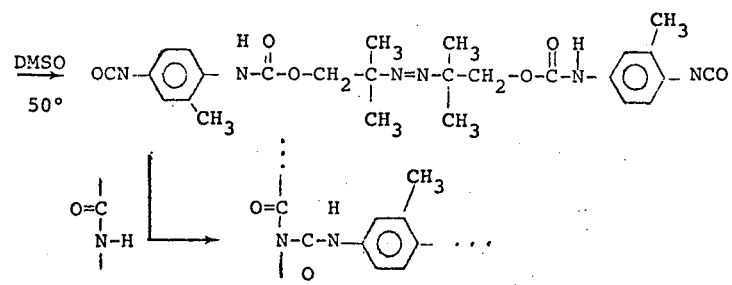

Polyureas

A heat-sensitive polyamine, such as (A) above, can be reacted with a polyisocyanate to produce a polyurea.

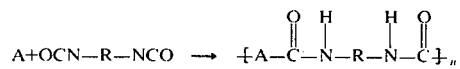

Polyesters

Heat-sensitive units of the type exemplified by azobisisobutanol (ABIB) can be incorporated in polyesters by transesterification polymerization with a suitable dimethyl ester.

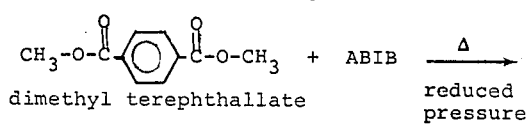
dimethyl terephthallate + ABIB $\xrightarrow[\text{reduced pressure}]{\Delta}$

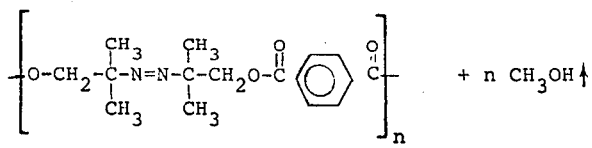 + n CH$_3$OH↑

By using a mixture of ABIB and another diol, the weak links can be randomly incorporated in the polyester in a controlled proportion.

Alternatively, a low $\overline{DP}$ (average degree of polymerization) prepolymer made by reacting an excess of the dimethyl terephthallate with a conventional diol can subsequently be "cured" or extended with ABIB to introduce heat sensitive end-to-end links between prepolymer chains. By this technique, the spacing, as well as the proportion of heat-sensitive skeletal segments in the resultant polymer can be closely controlled.

Polycarbonates

Again using ABIB as an exemplary H.S. azo group source material, a polycarbonate comprising such groups can be made as follows:

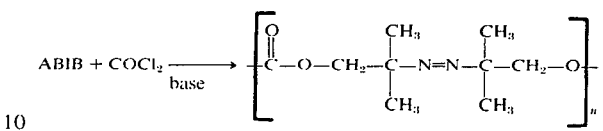

The proportion of heat sensitive groups in the polymer can be adjusted by using a mixture of ABIB and a conventional diol such as diethylene glycol, polypropylene glycol or 1,6-hexanediol. If a trifunctional polyol, such as glycerol, is included in the mixture, cross-linking can result and the "curing agent" used to attain final properties may be simply heat.

Aromatic polycarbonate precursors, such as Bisphenol-A, can be modified to incorporate a heat-sensitive unit and yet provide the physical properties exhibited by commercial polycarbonates:

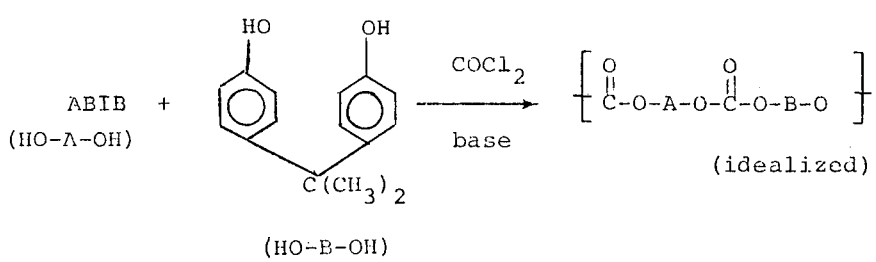

Polyepoxides

An uncured epoxy resin can be made by preparing an oxirane terminated linear polymer from a heat-sensitive diol, such as ABIB, and an epichlorohydrin:

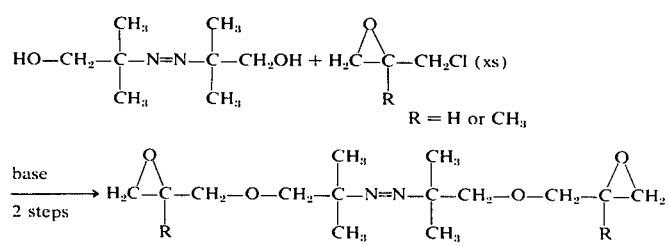

curing can then be effected with any of a variety of standard curing agents for epoxies, such as amines or anhydrides. If desired, the curing agent can comprise additional heat sensitive groups of the same or a different kind.

In another option, a conventional polyepoxide is partially cured with an amine and the resulting hydroxyl groups are cross-linked with a heat sensitive polyisocyanate prepared as follows:

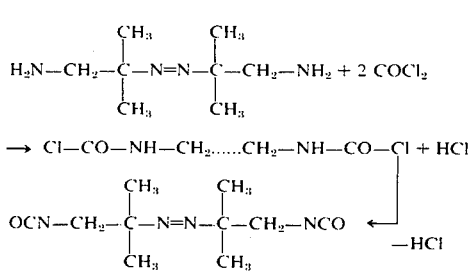

By use of an unsaturated diol in admixture with the ABIB, such as 2-butene-1,4-diol, provision for cross-linking by means of difunctional, olefin-reactive compounds (dithiols, for example) is made.

Vinylpolymers

As stated earlier herein, there is no way in which heat-sensitive units can be incorporated in a monoolefin in such a way as to become skeletal segments in a polymer of the olefin. However, H.S. groups can be incorporated in diolefins in several ways. For example, ABIB can be reacted with an acrylic acid ester to form an H.S. diacrylate compound:

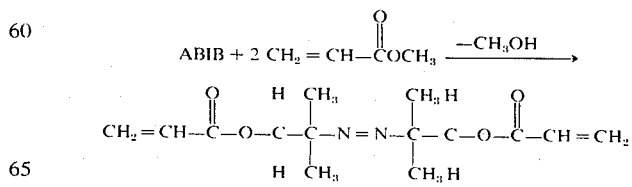

Copolymerization of the H.S. acrylate with a conventional vinyl monomer will then provide a heat-sensitive, cross-linked polymer.

A preferred approach is to prepare co-polymers of vinyl monomers such as ethylene or vinyl chloride with unsaturates which comprise a reactive functional group, such as acrylic acid, butadiene monoxide or allyl alcohol and then to cross-link with a heat-sensitive molecule such as ABIB, H₂N—CH₂—C(CH₃)₂—N=N—C(CH₃)₂—CH₂—NH₂ or the diisocyanate derivative of the latter amine, respectively.

Phenol-formaldehyde resins

Acid or base catalyzed condensation of phenol and formaldehyde is a relatively perfect polymerization reaction not likely to be improved upon by modification of either reactant. "Insertion" of an H.S. group appears neither desirable or feasible, since phenol contains three formaldehyde-reactive hydrogens, cross-linking can be achieved simply by applying sufficient heat and pressure. However, conventional phenol/formaldehyde resins are anything but readily degraded. The phenolic hydroxyls in linear φOH/HCHO polymers

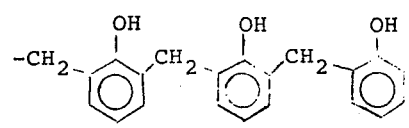

can be utilized to effect cross-linking through several types of difunctional compounds comprising H.S. groups; e.g.,

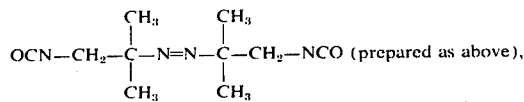

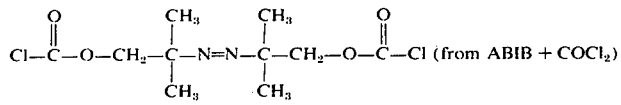

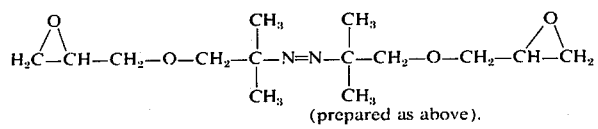

In the foregoing illustrations, ABIB has been used as a matter of convenience. The same methods or obvious variants can be employed with other heat-sensitive azo compounds terminated with —OH, —NH, COOH, —CN, etc. groups.

For example, the amido hydrogens in azo-bisformamide,

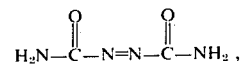

can be utilized to effect cross-linking between oxirane groups in polymers such as epoxy novolaks or between isocyanate terminated polyurethanes.

Examples are given hereinafter in which ABIB is incorporated in polyurethanes.

Incorporation of heat-sensitive moieties as esters (including carbonates) of hydroxy compounds having active β-hydrogens The following mono- or dihydroxy aliphatic compounds are known (or can be prepared as indicated). They are exemplary of compounds which contain an active hydrogen on a carbon beta to an alcholic hydroxyl and can be incorporated in polymers as carbonate or carboxylate esters.

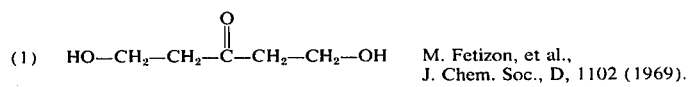

M. Fetizon, et al., J. Chem. Soc., D, 1102 (1969).

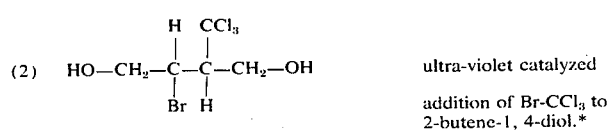

ultra-violet catalyzed addition of Br-CCl₃ to 2-butene-1, 4-diol.*

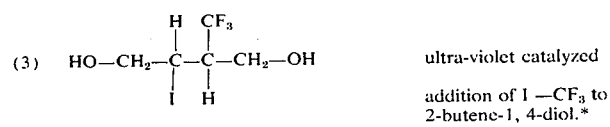

ultra-violet catalyzed addition of I —CF₃ to 2-butene-1, 4-diol.*

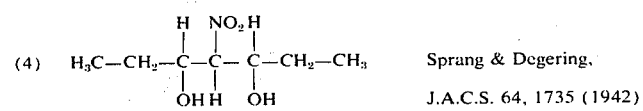

Sprang & Degering,

J.A.C.S. 64, 1735 (1942)

(5) 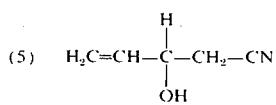   from addition of HCN to butadiene monoxide See Hormann, Ber., 12:23 (1879).
(6) di-(or tri-) functional cyanohydrins from addition of HCN to each oxirane group in the following known diepoxides:
a)    (caution: toxic and carcinogenic)
b) 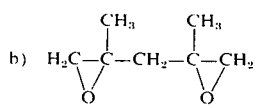
c) 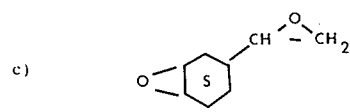
d) 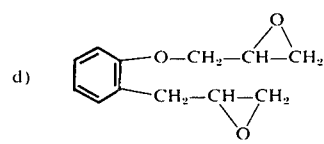
e) 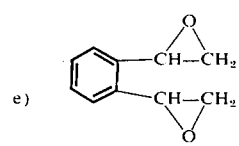
f) 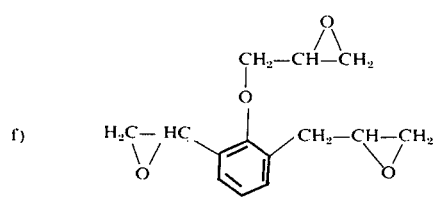
g) 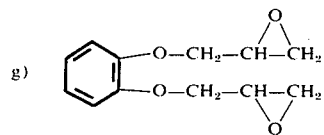
h) 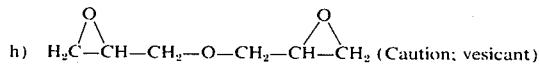 (Caution: vesicant)
i) 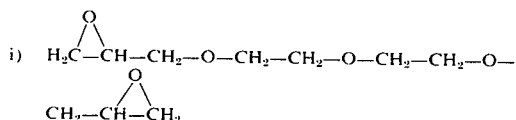
diethylene glycol, diglycidyl ether cis or trans
j) 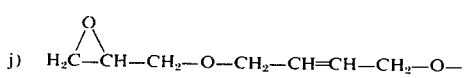
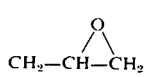
2 — butene — 1, 4 — diol, diglycidyl ether
k) 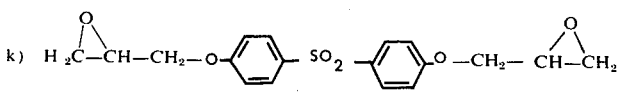
---
* See Kharasch, et al., J. Org. Chem 13, 895 (1948) and J.A.C.S., 69, 1100 (1947).

The manner in which each of the preceding six types of polyfunctional hydroxy radicals are incorporated as carbonate links in various types of polymers will be generally evident from the disclosure of the preceding section on incorporation of azo compounds. However, the following illustrations are provided:

A di- (or tri-) hydroxy compound is first reacted with excess phosgene to form the corresponding di-(or tri-) chlorocarbonate compound. The latter is then reacted with alcoholic or phenolic hydroxyls in polymers such as polyvinylalcohols (base hydrolyzed polyvinylacetates), polyglycols hydroxy terminated polyesters, hydroxy terminated polyurethanes, phenol-formaldehyde resins, etc. Epoxy resins may be linked by addition reactions of the chlorocarbonate groups with the oxirane groups; i.e.,

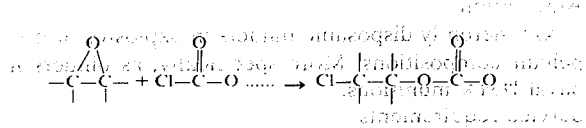

Compounds of type (5) preceding may be incorporated by copolymerization with vinyl monomers, followed by treatment with phosgene to form cross-links through carbonate groups with the pendant cyanohydrin groups. If difunctional carboxylic acids or acid chlorides are used instead of phosgene, cross-linking can be effected through carboxylate ester groups. Terephthalloyl chloride is an example of a suitable difunctional acyl halide.

The di- and tri-hydroxy compounds of (1)–(4), and (6) preceding can SOCl employed to link carboxyl terminated polyesters or polyamides. If necessary, the carboxyl groups can first be converted to acyl chloride groups, as with $SOCl_2$, or the hydroxy groups can be first be converted to chlorocarbonate groups with phosgene in excess. A wide variety of maleic anhydride copolymers with olefinic unsaturates such as ethylene, styrene, methyl vinyl ether, etc., can be reacted directly with the di- and tri-hydroxy compounds containing active β-hydrogens.

Similarly, mono-hydroxy compounds of types (1)–(4), and (6) may be used to end-cap terminal carboxyl (or acyl halide) functions.

Incorporation of heat-sensitive moieties an amine oxides having β-hydrogens

Exemplary, dihydroxy substituted amine oxides which have β-hydrogens and are known or may be made as indicated (and will form cleavable links) are:

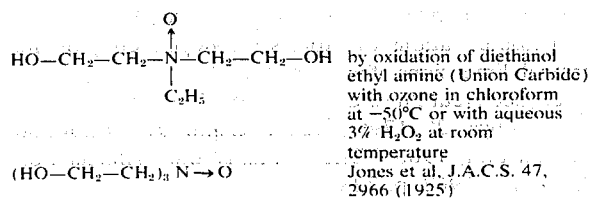

The hydroxy groups of such compounds can be reacted with oxirane, isocyanate, chlorocarbamate, anhydride, carboxyl or acyl halide groups in the various types of polymers listed in the preceding sections on azo links and ester links. It is of interest to note that diols (and triols) containing either amine oxide or azo groups will in many cases also comprise active β-hydrogens which will contribute to relatively facile cleavage of carbonate links. That is, single cross (or end-to-end)-links comprising two different kinds of heat-sensitive groups — carbonate and azo or amine oxide groups — can be incorporated in a wide variety of polymers.

Diethyl, ethanolamine-N-oxide is an exemplary monohydroxy N-oxide suitable for end-capping uses.

Exemplary, unsaturated amine oxides which contain β-hydrogens and will form cleavable links are prepared as indicated:

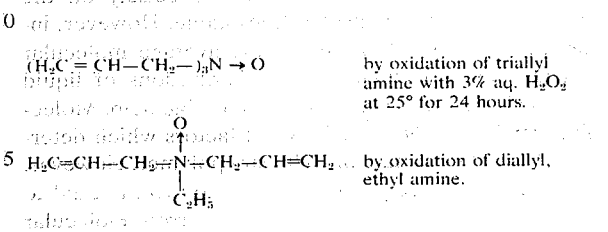

The latter compounds can be incorporated in vinyl polymers by copolymerization with olefinically unsaturated monomers such as propylene, divinyl benzenes, cyclo-pentadiene, long chain α of olefins, etc. They may also be employed to effect cross-linking of pre-formed polymers or copolymers of dienes, such as butadiene.

The preceding discussions of methods of incorporating carbonate, carboxylate ester and amine-oxide groups have been limited to the use of hydroxy or vinyl end groups to effect linking. However, other reactive end groups which are not so strongly basic as to have a deactivating effect on the β-hydrogens are also adaptable to the practice of the present invention, as will be apparent to polymer chemists of ordinary skill.

Proportion and distribution of heat-sensitive groups

The simplest way to ensure that the degraded resin will be flowable is to start with a linear prepolymer that is a liquid and has sites for attachment of heat-sensitive cross-links. The number of such sites required to provide the requisite properties in the cured resin upon cross-linking is determined by methods already familiar to skilled polymer chemists. This approach is analogous to closing a zipper.

End-to-end linking of polymer chains, in addition to or instead of cross-linking may also be effected by a di- or tri- functional H.S. linking compound under conditions commonly employed to effect chain extension and/or linking.

If desired, the liquid pre-polymer can also include some H.S. groups to counter-act the effects of any fragments of cross-links which will remain attached to the polymer chain after the resin is degraded. In general, however, the branching resulting from such fragments will tend to decrease the flow temperature of the degraded resin. Fragment retention will usually result when the heat-sensitive group in the linking compound is an azo or amine-oxide group. If the linking moiety is connected to the polymer chain through heat-sensitive carbonate or carboxylate ester groups, fragment retention will not occur. Instead, the non-volatile residues of the H.S. links will report in the degraded resin as unattached molecules which may have some minor effect on its fluidity.

If the initial polymerization reaction(s) cannot be controlled to give a liquid prepolymer which is otherwise suitable, or if the skeletal segments between H.S. groups in the linking compound must be relatively long, inclusion of H.S. links within the prepolymer chains is indicated. That is, an H.S. compound must constitute or be reacted into one or more of the monomers from which the prepolymer (or uncured) resin is formed. Examples of such monomers are ABIB itself, the 2:1 reaction product of ABIB with a diacyl halide or the 1:2 reaction product of ABIB with a diisocyanate.

The proportion and distribution of H.S. groups required to render a given resin flowable upon degradation usually cannot be determined precisely on the basis of theoretical considerations alone. However, information in the literature on the average molecular weights and molecular weight distributions of liquid and solid polymers can be of considerable help. Molecular weight is only one of several factors which determine the physical state of a (linear) polymer. However, for each type of polymer, the transition from liquid to solid takes place within a relatively narrow molecular weight range. The literature includes such ranges for a wide variety of polymers. As a rough guide, only a few of the most highly polar polymers have substantial cohesive strengths, i.e., shear resistance, at average molecular weights corresponding to less than about 20 repeating units. On the other hand, most polymers having an average molecular weight of 5,000 are at least waxy solids.

In any event, the proof of the polymer is in the heating and some empirical testing of laboratory scale resin preparations will be necessary — at least for optimization. However, it is not necessary to carry all such preparations through the curing stage before making degradation tests. If a solid, H.S. prepolymer or uncured resin will itself not degrade to a flowable mass upon heating, it is not likely that the use of an H.S. linking agent will make the cured resin degradable to a flowable mass. On the other hand, the nature of the linking which takes place during curing of a high melting prepolymer may be such that reversion to a flowable mass upon cleavage of the H.S. groups does not appear certain. In either case, testing of a few resins of successively higher (or lower) H.S. group contents should settle the question. Since H.S. compounds can be used as, or in, "building blocks" in forming an H.S. prepolymer, very good control over the proportion of and spacing between H.S. groups is obtained by the use of known techniques for "constructing" polymer chains. Ordinarily, the minimum proportion of H.S. groups (the specific atom pairs joined by thermally sensitive bonds) required will constitute from about 0.1 to about 3 weight percent of the cured H.S. resin (assuming essentially all H.S. groups cleave).

Assuming a random order of cleavage of the H.S. groups in a resin, the greater the number of such groups present, the smaller the fraction that need to decompose to cause a significant change in the properties of the resin. In general, then, it will be advantageous from the standpoint of required heating times to use a higher proportion of H.S. groups than the minimum required. Similarly, greater efficiency should result when the H.S. groups are more evenly spaced in the resin. That is, it is preferable that the lengths of different skeletal segments between H.S. groups be approximately the same. A simple method of adjusting the concentration of H.S. groups in a pre-polymer (or chain-extended "monomer") is to vary the molecular weight of a chain-extender which is coupled to an H.S. monomer. This is illustrated in specific Examples 2, 4 and 5 hereinafter.

Another method is to vary the number of sites for cross-linking or chain extension with an H.S. curing agent by varying the functionality of a prepolymer component. Yet another method is to vary the relative proportions of two H.S. monomers which differ in composition and/or reactivity (in prepolymer formation or linking). When different H.S. compounds are used, it is not necessary for the H.S. groups to be of the same nature or to have the same 1 hour half-life temperatures. However, there will generally not be much point in using two or more kinds of H.S. groups which cleave at substantially different rates.

SPECIFIC EXAMPLES

I. Design, preparation and testing of heat sensitive, cured polyurethane resins

Application

As inherently disposable binders in explosive or propellant compositions. More specifically, as binders in naval HMX munitions.

Service requirements

A suitable binder must have the flexibility, strength, density and stability properties of conventional binders and must thermally degrade at a temperature well above the maximum service temperature and well below the autoignition temperature of the explosive. The degradation must be controllable, non-exothermic and capable of being carried out at a predictable rate. The degradation products must be a fluidic mass amenable to removal from the device and to further workup for salvaging of the explosive ingredients.

The maximum service temperature was taken to be 75°C. (Navy test WR-50 requires that no physical change be apparent after a total of 14 days at 165°F (75°C).) The maximum temperature permissible for degradation of the binder was taken to be 200°C, i.e., the temperature at which no more than 1 percent decomposition of HMX is expected to occur in 3 hours (three half-lives for a binder having a 1 hour half-life temperature of 200°). Because of self heating a cylindrical plastic-bonded charge should not exceed 100 mm in diameter, a spherical charge should not exceed 125 mm in diameter. These limits depend on the purity of the HMX and the degree to which the binder and/or the decomposition products dissolve or react with the HMX.

Kinetic parameters

The temperature of 200°C for less than 1% decomposition of HMX in 3 hours was obtained from the literature (A.J.B. Robertson, Trans. Faraday Soc., 45, 85 (1949). The size limits were estimated using the Frank-Kamenetskii and Chambre solution to self-heating and heat loss equations to express the dependency of the critical dimensions of an explosive on size and temperature. (See Acta Phys. Chem. USSR, 10, 365 (1939), J. Chem. Phys., 20, 1795 (1952), "Eighth Symposium on Combustion, 1960," The Williams and Wilkens Co., Baltimore, 1962, p. 728.)

Setting an upper limit of 10% decomposition of the binder at 75°C in 14 days (336 hours) and assuming the decomposition is first order, the corresponding maximum permissible rate constant at 75° was calculated from the relationship $ln [X]_o/[X] = k.t$, where $[X]_o$ is the initial concentration of heat-sensitive bonds and $[X]$ is the concentration of a later time $t$. For 10% decomposition in 336 hours $(=1.2 \times 10^6 \text{ sec})$, $(1.2 \times 10^6)k = ln 1.0/0.9$, or $k = 8.8 \times 10^{-8} \text{ sec}^{-1}$.

Assuming $A = 10^{14}$ sec$^{-1}$, an ideal Arrhenius line (log $k$ vs $1/T$) was then drawn through this point ($E_a = 33.4$ k cal/mole) and used to find the minimum temperature (139°) required to attain 50% decomposition in 1 hour. Arrhenius lines were also constructed (using literature values of A and E for first order decompositions) for four heat-sensitive azo compounds. The line for phenylazodiphenylmethane ($\phi$—N=N—CH$\phi_2$) closely approximated the ideal line. Azotoluene and azoisobutane were more stable than required and azoisopropane was much too stable.

Model azo compounds

Primary and secondary R radicals derived from the decomposition R—N=N—R → 2R . + N$_2$, are known to predominantly recombine, i.e., 2 R . → R—R. No net cleavage in the binder can result from such a decomposition unless R . can rapidly rearrange to give products that do not couple. However, tertiary radicals largely disproportionate to alkane and alkene mixtures. Azocompounds having the following configuration were selected as model compounds.

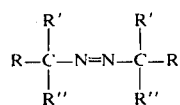

Table 2 gives the 130° and 150° half-lives calculated from literature values of A and E for a variety of model azocompounds having this configuration.

Table 2

HALF-LIVES FOR THE DECOMPOSITION OF AZO COMPOUNDS

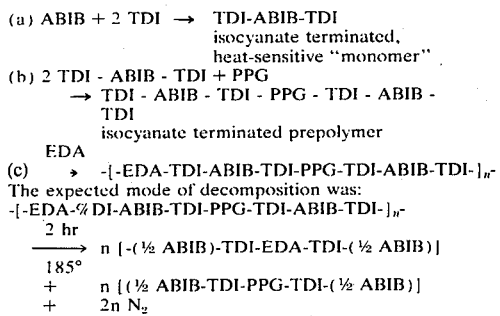

| R | R' | R'' | log A (sec$^{-1}$) | Ea (kcal/mol) | $t_{1/2}^{130°}$ (hr) | $t_{1/2}^{150°}$ (hr) |
|---|---|---|---|---|---|---|
| H | H | H | 16.5 | 52.5 |  | 8.1×10$^6$ |
| F | F | F | 16.2 | 55.2 |  | 4.0×10$^8$ |
| H$_3$— | H | H | 16.3 | 50.0 |  | 6.5×10$^5$ |
| H$_3$— |  | H | 16.4 | 47.5 |  | 2.6×10$^4$ |
| H$_3$— | H$_3$— |  | 17.15 | 43.5 | 151 | 40.5 |
| H$_3$— | H$_3$— | H$_3$— |  |  |  |  |
| Ph— | H— | H— | 15.3 | 37.6 | 23.6 | 2.57 |
| Ph— |  | H— | 14.8 | 32.6 | 0.14 | 0.02 |
| Ph— | H$_3$— |  | 15.7 | 29.6 | 4.3×10$^{-1}$ | 7.5×10$^{-3}$ |
| Ph— | H$_3$— | H$_3$— | 13.7 | 26.6 | 1.0×10$^{-3}$ | 2.1×10$^{-4}$ |
| CN |  |  | 15.6 | 31.3 | 4.5×10$^{-3}$ | 7.1×10$^{-4}$ |
| CN | H$_3$— | H$_3$— | 16.8 | 35.4 | 0.048 | 5.9×10$^{-3}$ |
| CN | —(CH$_2$)$_3$— |  | 15.7 | 33.8 | 0.082 | 1.0×10$^{-2}$ |
| CN | —(CH$_2$)$_4$— |  | 13.1 | 32.1 | 3.8 | 0.58 |
| CN | —(CH$_2$)$_5$— |  |  |  |  |  |

Preparation of experimental, heat-sensitive binder resins

Azobisisobutanol (ABIB) was selected as a promising and convenient compound for incorporation of H.S. groups in a variety of polymer types. This diol was prepared in two steps from azobisisobutyronitrile according to the procedure of Mortimer, J. Org. Chem., 30, 1632 (1965). Purification to a melting range of 66.8° was effected by several recrystallizations and prolonged drying (the literature m.p., 108°C, is attainable only by careful chromatographic purification using an alumina column).

Polyurethanes have proven to be excellent binders for RDX and HMX explosives and are readily made by diol/diisocyanate reactions at low cure temperatures. (See U.S. Pat. Nos. 3,245,849; 3,266,959; 3,781,229 and 3,784,522). Accordingly, this type of polymer was chosen for incorporation of azobisisobutanol units.

EXAMPLE 1

Amine-cured, H.S. polyurethane A was designed to be linear and to contain about 11 wt. % of ABIB, or ~1.8% of azo (—N=N—) links. It was expected to degrade in 2 hours at 185°C. The synthesis scheme follows (TDI = tolylene diisocyanate; EDA = ethylendiamine and PPG =2000 polypropylene glycol, mol. wt. 2029; Dow Chemical Co.)

(a) ABIB + 2 TDI → TDI-ABIB-TDI
  isocyanate terminated,
  heat-sensitive "monomer"
(b) 2 TDI - ABIB - TDI + PPG
  → TDI - ABIB - TDI - PPG - TDI - ABIB - TDI
  isocyanate terminated prepolymer
  EDA
(c) → -[-EDA-TDI-ABIB-TDI-PPG-TDI-ABIB-TDI-]$_n$-
The expected mode of decomposition was:
-[-EDA-½DI-ABIB-TDI-PPG-TDI-ABIB-TDI-]$_n$-
  $\xrightarrow[185°]{2 \text{ hr}}$ n [-(½ ABIB)-TDI-EDA-TDI-(½ ABIB)]
  + n [(½ ABIB-TDI-PPG-TDI-(½ ABIB)]
  + 2n N$_2$ Azobisisobutanol End-Capped with Toluene Disocyanate Freshly distilled toluene diisocyanate (11.0 g, 63 mmol) and azobisisobutanol (5.0 g, 28.7 mmol) were placed in a 250-ml three-neck flask fitted with a mechanical stirrer, thermometer, condenser, and nitrogen inlet tube. The solution was heated at 100°C for 3 hr. Ir analysis indicated that a H—N—C=O bond had formed. After 1.5 hr the mixture became very viscous and had a melting point of ~120°C. Mass spectrometry of the product was not definitive; however, the fragmentation pattern indicated that the urethane and azo groups were present. Because of the high viscosity of this material, hot DMF (200 ml) was added, and the product readily dissolved. Within 30 min at 100°C a reaction occurred which produced a polymer. This result indicated that DMF is not a suitable solvent for subsequent polymerization. The high melting point of the solid (>180°C) indicated that a high polymer had been formed; however, no additional work was performed on this product.

Polyurethane A

To a 250-ml three-neck flask fitted with a mechanical stirrer, thermometer, condenser, and inlet tube was added freshly distilled toluene diisocyanate (11.0 g, 63 mmol) and azobisisobutanol (5.0 g, 28 mmol). The mixture was heated at 70°C for 3 hours with continuous stirring under nitrogen. This end-capped product did not become nearly as viscous as that obtained in the previous reaction. To this product was added 0.5 equivalent of freshly degassed polypropylene glycol (PPG, MW 2029, 28.5 g, 14 mmol) and freshly distilled dimethyl sulfoxide (DMSO) as solvent. This solution was heated rapidly to 90°–100°C and maintained at this temperature for 3 hr with continuous stirring under nitrogen with no apparent increase in viscosity. The mixture was cooled to 30°C and ethylene diamine (EDA, 1 g, 16 mmol) in 20 ml of DMSO was added. Within seconds, the reaction mixture changed from a colorless mobile liquid to a translucent viscous mixture, which was stirred for 20 min to ensure complete reaction. The mixture was quenched in a large volume of water, chopped in a Waring blender, washed several times with hot water, and dried overnight in a vacuum oven at 60°C. Removal of residual DMSO and water required additional heating for 24 hr at 60°C to obtain a constant weight of 39 g.

Testing of Heat-Sensitive Polyurethane A—Solubility 500 mg of the polyurethane No. 1 was added to 10 ml each of DMF, DMSO, DMAC, $CH_3CN$, THF, and pyridine N-oxide. The polymer was not soluble in these solvents at 20°C or when heated to 50°C.

Four samples of the Polyurethane A pressed at 100°C were heated at 185°C in air to determine heat stability. The results are shown in Table 3.

Table 3

HEAT STABILITY OF POLYURETHANE A AT 185°C

| Sample | Time (hr) | Results |
|---|---|---|
| 0 | 0 | White rubbery polymer. |
| 1 | 0.5 | Yellow, softened, gas bubbles present. |
| 2 | 1.0 | Darker yellow, softened, mobile liquid at 100°C, more rigid at 20°C, gas bubbles present. |
| 3 | 1.5 | Brown, mobile liquid at 100°C which flowed under own weight, at 20°C flowed under pressure, few bubbles present. |
| 4 | 2.0 | Brown, mobile liquid at 100°C and flowed slightly at 20°C, tacky to touch at 20°C. |

EXAMPLE 2

Diol-cured H.S. polyurethane B. Essentially the same scheme was used as in Example 1 but 1,4-butanediol (BDO) was used in place of the amine-curing agent.

Azobisisobutanol (3.0 g, 17 mmol) was treated with toluenediisocyanate (6.0 g, 34 mmol) at 70°C for 2 hr under nitrogen to obtain the endcapped structure. This colorless material did not exhibit high viscosity and solidified only upon cooling. To this end-capped material was added freshly distilled PPG (MW 2029, 17.5 g, 8.6 mmol) and dimethyl sulfoxide (25 ml) as solvent. The solution was heated rapidly to 95°–100°C and maintained at that temperature for 2 hr with continuous stirring under nitrogen. The solution was cooled at 30°C and freshly distilled 1,4-butanediol (0.77 g, 8.6 mmol) in 10 ml of DMSO was added over a 15-min period. A slight increase in viscosity was observed. The reaction mixture was heated rapidly to 90°–100°C. As the viscosity of the solution increased, the reaction mixture changed from a colorless mobile liquid to a translucent polymeric material which would not flow under its own weight. This polymeric material was stirred for 10–15 min to ensure complete reaction. The reaction product was quenched in a large volume of water and turned an opaque white. The polymer was washed with several changes of cold water, cut into small portions, washed several times with hot water, and dried for 48 hr in a vacuum oven at 60°–65°C. The white rubbery polymer dissolved as a 10% solution in hot DMSO but precipitated upon cooling. However, attempts to dissolve it in hot DMF, DMAC, and pyridine-N-oxide produced translucent gels. This solubility indicates that this alcohol-cured polyurethane was crosslinked but less so than the amine-cured polymers. Samples of the alcohol-cured polyurethane B $$-(BDO-TDI-ABIB-TDI-PPG_{2000}-TDI-ABIB-TDI)_n-$$

were subjected to thermal testing in air. The temperatures examined were 150°, 185°, and 250°C. The results are shown in Tables 4–6.

Table 4

HEAT STABILITY OF POLYURETHANE B AT 150°C IN AIR

| Sample | Time (min) | Results |
|---|---|---|
| 0 | 0 | White, rubbery polymer |
| 1 | 2 | No change |
| 3 | 6 | Slight flow |
| 4 | 10 | Slight softening and flow |

Table 5

HEAT STABILITY OF POLYURETHANE B AT 185°C IN AIR

| Sample | Time (min) | Results |
|---|---|---|
| 0 | 0 | White rubbery polymer. |
| 1 | 5 | Melted within 3 min. Flows easily when cooled to ~100°C. Tacky at 25°C. |
| 2 | 10 | Slight darkening. Flows easily when cooled to about 100°C. Tacky at 25°C. |
| 3 | 15 | Slight darkening, evolution of gas nearly complete. Flows under pressure when cooled to 25°C. |
| 4 | 20 | Slight darkening, gas evolution complete. Flows under pressure when cooled to 25°C. |

Table 6

HEAT STABILITY OF POLYURETHANE B AT 250°C IN AIR

| Sample | Time (min) | Results |
|---|---|---|
| 0 | 0 | White rubbery polymer. |
| 1 | 2 | Rapid evolution of gas in 30 seconds. No discoloration, tacky, but flows under pressure when cooled to 25°C. |
| 2 | 4 | Gas evolution complete. Flows under pressure when cooled to 25°C. |
| 3 | 6 | Slight discoloration, same as 2. |
| 4 | 8 | More discoloration. Flow characteristics same. |

Nitrogen evolution measurements were made as follows: Samples of approximately 0.2 to 0.5 g of the heat-sensitive Polyurethane B were accurately weighed, degassed, and sealed in Pyrex reaction tubes. After heating one set of samples at 160°C and another set at 185°C for varying periods, the tubes were attached to the gas-analysis portion of a vacuum line to determine the amounts of nitrogen evolved. The amount of azo groups remaining was estimated by subtracting the moles of $N_2$ formed per gram from the moles of azo compound per gram placed in the polymer. The physical properties of the polymer changed from a rubbery solid to a viscous liquid, thus confirming the heat-stability observations reported above.

The decomposition of azo groups gave an initial first-order decomposition rate constant of $2.4 \pm 1.0 \times 10^{-4}$ sec$^{-1}$ at 185°C and $1.4 \times 10^{-5}$ sec$^{-1}$ at 160°C. The literature values for the azoisobutanol diacetate in cyclohexane are $2.2 \times 10^{-4}$ sec$^{-1}$ at 185°C and $1.6 \times 10^{-5}$ sec$^{-1}$ at 160°C. Thus the decomposition data of the ABIB groups in the diol-cured Polyurethane B agree well with the data on the less viscous azoisobutanol diacetate, and support the results obtained with the diamine-cured Polyurethane A containing ABIB groups.

EXAMPLE 3

Diol cured, polyurethane C (non-H.S.; control). Essentially the same procedure as was used in Example 2 was followed, except that 1,6-hexane diol was used in place of the heat-sensitive diol (ABIB). This was to permit a comparison between otherwise essentially identical polymers comprising and lacking the heat-sensitive azo group.

1,6-Hexanediol (2.0 g, 17.2 mmol) was treated with toluene diisocyanate (6.0 g, 34 mmol) at 70°C for 2 hr under nitrogen to obtain the end-capped structure. After about 1 hr the reaction mixture turned from a colorless viscous liquid to a white solid. The white solid dissolved easily in warm DMSO (20 ml), and freshly degassed PPG (MW ~2029, 17.5 g, 8.6 mmol) in 20 ml of DMSO was added. The solution was heated rapidly to 95°–100°C and maintained at that temperature for 2 hr with continuous stirring under nitrogen. The solution was cooled to 30°C and 0.5 equivalent of freshly distilled 1,4-butanediol (0.77 g, 8.6 mmol) in 10 ml of DMSO was added over 5 min. The reaction mixture was heated to 95°–100°C and maintained at this temperature for 1 hr; only a light increase in viscosity was noted. The solution was quenched in water, and the opaque white polymer precipitated. The very rubbery polymer was washed several times with water and dried for 48 hr in a vacuum oven at 55°C.

Solution of the dried polymer (10% in DMF and also in DMSO) were cast to give transparent films upon evaporation of the solvent.

Samples of the control polymer were tested to determine stability at 185°C in air, the temperature at which the polyurethanes containing the azo linkage were degraded. After 0.5 hr the polymer had melted and sagged, but did not flow. On cooling to 25°C, it appeared to have recovered all of its physical properties. After 2 hr a slight discoloration was observed but again upon cooling to 25°C essentially all the original physical properties were regained.

EXAMPLE 4

Diol cured, H.S. polyurethane D. Polypropylene glycol having a molecular weight of about 425 (PPG$_{425}$; Dow) was substituted for PPG$_{2000}$ in the procedure of Example 2, thereby providing a shorter, stiffer chain-extender and increasing the concentration of heat-sensitive groups in the polymer.

Azobisisobutanol (3.0 g, 17 mmol) was treated with toluenediisocyanate (6.0 g, 34 mmol) at 70°C for 2 hr under nitrogen to obtain the end-capped structure. This colorless material did not exhibit high viscosity and solidified only upon cooling. To this endcapped material was added freshly distilled PPG (MW 425, 3.68 g, 8.6 mmol) and dimethyl sulfoxide (25 ml) as solvent. The solution was heated rapidly to 95°–100°C and maintained at that temperature for 2 hr with continuous stirring under nitrogen. The solution was cooled to 30°C and freshly distilled 1,4-butanediol (0.77 g, 8.6 mmol) in 10 ml of DMSO was added over a 15-min period. A slight increase in viscosity was observed. The reaction mixture was heated rapidly to 90°–100°C. This polymeric material was stirred for 1 hr to ensure complete reaction. The reaction product was quenched in a large volume of water and precipitated as an opaque white solid. The polymer was washed with several changes of cold water, cut into small portions, washed several times with hot water, and dried for 48 hr in a vacuum oven at 60°–65°C to give 20 g of material.

The white, stiff polymer "dissolved" in hot DMSO, DMF, DMAC, and pyridine-N-oxide to produce translucent gels. This lack of solubility indicates that this alcohol-cured polyurethane was crosslinked. Four samples of Polyurethane D were heated at 185°C in air to determine heat stability. The results are shown in Table 7.

Table 7

HEAT STABILITY OF POLYURETHANE D AT 185°C IN AIR

| Sample | Time (hr) | Results |
|---|---|---|
| 0 | 0 | White stiff polymer. |
| 1 | 0.5 | Slow melting--rigid structure. |
| 2 | 1.0 | Additional melting, discoloration, and gas evolution. On cooling to 25°C, rigid structure. |
| 3 | 1.5 | Discoloration. Fluid at elevated temperatures. Brittle when cooled to 25°C. |
| 4 | 2.0 | Discoloration--gas evolution, fluid at 100°C. On cooling to 25°C, brittle solid obtained. |

EXAMPLE 5

Diol cured, H.S. polyurethane E. Polypropylene glycol having a molecular weight of 3817 (PPG$_{4000}$; Dow) was substituted for PPG$_{2000}$ in the procedure of Example 2, thereby providing a longer, more flexible chain extender and reducing the concentration of heat-sensitive groups in the polymer.

Azo bisisobutanol (3.0 g, 17 mmol) was treated with toluene diisocyanate (6.0 g, 34 mmol) at 70°C for 40 minutes under nitrogen to obtain the endcapped structure. This colorless material did not exhibit high viscosity and solidified only upon cooling. DMSO (10 ml) was added and heated at 70°C for 30 min until the solid dissolved. To this endcapped material was added freshly distilled PPG$_{4000}$ (MW 3817 32.8 g, 8.6 mmol, from Dow Chemical Co.) and hot dimethyl sulfoxide (60 ml) as solvent. The solution was heated rapidly to 80°C then 90°C for 1 hr with continuous stirring under nitrogen. The solution was cooled to 30°C, and freshly distilled 1,4-butanediol (0.77 g, 8.6 mmol) in 10 ml of DMSO was added over a 15-min period. A slight increase in viscosity was observed. The reaction mixture was heated rapidly to 90°–100°C. This polymeric material was stirred for 1 hr to ensure complete reaction.

The viscosity of the solution increased slightly. The reaction product was quenched in a large volume of water and precipitated as an opaque white solid. The polymer was washed with several changes of cold water, washed several times with hot water, and dried for 150 hr in a vacuum oven at 50°–60°C to give 36 g of material.

Comparisons of polyurethanes B, D, and E

Changing the size of PPG linkage changed the effective concentration of thermally sensitive group ABIB in each polymer, i.e., polymer D, from $PPG_{425}$ contained 21.9% ABIB; polymer B, from $PPG_{2000}$ contained 10.9% ABIB; and polymer E, from $PPG_{4000}$ contained 7.0% ABIB.

Samples of the three-heat-sensitive polyurethanes were degraded in air at 185°C over a 2-hr period. The polyurethane containing $PPG_{425}$ degraded; however, when cooled to room temperature it became a brittle solid. The polyurethane $PPG_{2000}$ produced a liquid that would flow with slight pressure. The polyurethane containing $PPG_{4000}$ was very rubbery and degraded to a liquid that would almost flow under its own weight.

Table 8, following, summarizes the solubility properties of polyurethanes B, D and E, before and after degradation.

EXAMPLE 6

Cross-linked, triol cured, H.S. polyurethane F. The scheme employed in Example 2 was modified by using trimethylolpropane (TMP, herein) in place of 1,4-butane diol as the curing agent.

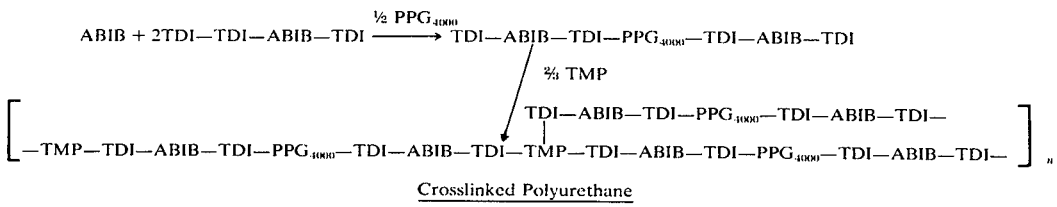

Crosslinked Polyurethane

Complete cure was obtained by heating at 60°C for 48 hr, although room temperature cures can be obtained using a longer time or suitable catalysts.

After curing the polymer was degraded at 185°C for 2 hr for comparison with degraded samples of the analogous chain-extended polymer. The cross-linked polymer lost all rigid properties upon heating and degraded to a liquid that would flow under its own weight when cooled to ambient temperature. Thus, the physical properties of the degraded crosslinked polyurethane are essentially the same as the properties of the degraded chain-extended polyurethanes examined earlier.

This experimental result was as expected because the fragments obtained from degradation of both types of polymers have about the same molecular weight and number of functional groups. Degradation of the crosslinked polyurethane theoretically would give the products shown below.

Table 8

SOLUBILITY OF PPG POLYURETHANES
$(-BDO-TDI-ABIB-TDI-PPG_x-TDI-ABIB-TDI)_n-$
x = 425, 2000, and 4000

| Solvent[a] | $PPG_{425}$ | | $PPG_{2000}$ | | $PPG_{4000}$ | |
|---|---|---|---|---|---|---|
| | Before Degradation | After Degradation 185°C/2 hr | Before Degradation | After Degradation 185°C/2 hr | Before Degradation | After Degradation 185°C/2 hr |
| Methylene chloride | S | S | S within 1 hr | S | S | SS |
| Acetone | S | S | S within 1 hr | S | S | SS |
| Diethyl ether | I | I | — | S | S | I |
| Ethanol | SS | SS | S within 1 hr | S | SS | SS |
| Benzene | I | I | S within 1 hr | S | S | SS |
| Acetonitrile | SS | I | — | S | SS | SS |
| Dimethyl-sulfoxide | I | S | S cold after 1 hr | S | I | S |
| Dimethyl-formamide | SS | S | S cold after 1 hr | S | I | S |
| Water | I | I | I | I | I | I |

[a] Polymer concentration 10% w/v
S = Soluble: Dissolves in less than 5 min with stirring.
SS = Slightly Soluble: Solvent discolored but not complete solution within 1 hr and with stirring.
I = Insoluble: Insoluble after 1 hr with stirring.

Crosslinked Polyurethane

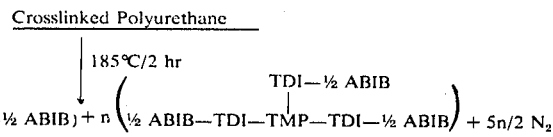

Azobisisobutanol (3.0 g, 17 mmol) was treated with toluene diisocyanate (6.0 g, 34 mmol) at 70°C for 2 hr under nitrogen to obtain the endcapped structure. This colorless material did not exhibit high viscosity and solidified only upon cooling. To this endcapped material was added freshly degassed PPG$_{4000}$ (MW 3817, 32.8 g, 8.6 mmol, from Dow Chemical Company). The solution was heated rapidly to 80°C then 90°C for 1 hr with continuous stirring under nitrogen, resulting in a clear yellow liquid. The solution was cooled to 30°C, then reheated to 40°C, and degassed trimethylol propane, (0.79 g, 5.7 mmol) was added over a 15-min period. A slight increase in viscosity was observed. The reaction mixture was heated rapidly to 90°–110°C. This polymeric material was stirred for 1 hr to ensure complete reaction. The viscosity of the solution increased slightly.

The polymer was then cured at 65°C for 48 hr to give a very rubbery clear polymer.

This rubbery polymer was insoluble or formed gels in methylene chloride, acetone, diethyl ether, ethanol, benzene, acetonitrile, DMSO, DMF and water.

A sample of the polymer was heated at 185°C for 2 hr in air to give a brown honey-like liquid that would flow under its own weight at ambient temperature. The degraded polyurethane was soluble in the above organic solvents as a 10% solution except for water.

EXAMPLE 7

Polymer of Example 6 loaded with from 75 to 90 wt % solids with KCl (simulated explosive).

The crosslinked polyurethane was prepared according to the method described in the preceding example. About 20 g of the uncured polymer was placed in a Brabender Mixer (Mold S-120) at 100°C under nitrogen and stirred at approximately 150 rpm. To this polyurethane was added 60 g of potassium chloride (properly sieved) and mixed at 100°C for 15 minutes. The white, loaded polyurethane was then cured at 65°C for 44 hr. Samples of the unloaded polyurethane were degraded at 185°C for 2 hr. The polyurethane lost all physical properties and became a paste that could be moved easily by mechanical means.

The degraded loaded polyurethane was soluble as a 10% solution in methylene chloride, while the potassium chloride settled out.

To determine the change in physical properties of the loaded polymer as the solids content was increased, there were prepared crosslinked polyurethanes containing 80, 85, and 90 wt % of KCl. At the 80 and 85% levels the loaded polymer appeared to maintain most of its physical properties as compared with the 75% level. At 90% solids, a fluffy powder was obtained. However, by pressing, it was possible to obtain a very weakly cohesive solid.

These results demonstrate that a heat-sensitive polyurethane can be (1) prepared by a solventless process, (2) loaded to 75% with an inert solid, and (3) degraded at the predicted temperature to give products that are soluble in common solvents. The solubility of the degradation products in common solvents is very useful in the recovery and recycle of the solid explosive ingredients HMX and RDX.

What is claimed is:

1. A process for forming a flowable composition in situ by thermal degradation of a solid polymer, said process comprising:

1. providing a solid polymer formed by the action of heat, radiation or a chemical curing agent on a resin which is not fully cured, said agent or said resin or both containing a plurality of heat sensitive skeletal segments, the composition of said segments in said polymer being such that at least half of those present at any time will have been cleaved after 1 hour at a temperature $T_D$ at which essentially all other chemical bonds in said polymer remain unbroken after 1 hour, 2. heating said polymer, at a temperature ($T_H$) which is not higher than $T_D$, until the polymer is degraded to a mass which is flowable at or below $T_H$, said polymer being formed at a temperature less than $T_D$, and said heating being carried out essentially in the absence of any materials reactive with said mass.

2. The process of claim 1 in which each of said heat-sensitive skeletal segments contains a heat-sensitive group selected from the class consisting of (I) azo groups; (II) carbonate groups, (III) ester groups and (IV) amine oxide groups, said types of groups being defined as follows:

I is a divalent radical having the formula

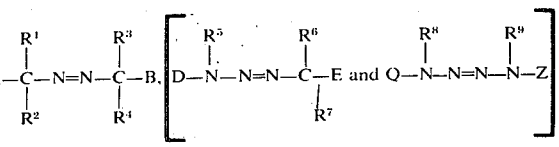

wherein,

A and B independently are —CH=CH—, —CH$_2$—, —O—, —NH—,

phenylene or, when the adjacent, —CRR— moiety is —CH$_2$—, may with that moiety constitute a cycloalkylene group of 3 to 8 carbons, each or both of —CR$^1$R$^2$— and —CR$^3$R$^4$— may be

and each R radical, when not part of a carbonyl group, independently is H, —CN, C$_1$–C$_5$ alkyl, fluoro, C$_2$–C$_5$ alkenyl, C$_5$–C$_6$ cycloalkyl, phenyl or tolyl, each of the latter hydrocarbyl groups being optionally substituted with a bromo, chloro, fluoro, cyano, C$_1$–C$_3$ alkoxy, C$_2$–C$_3$ alkenyloxy, dimethyl amino or diethylamino group;

with the reservation that no one carbon may be bonded to both oxygen and cyano, to two cyano groups or to more than one group selected from said cycloalkyl, phenyl or tolyl groups;

II is a divalent radical having the formula

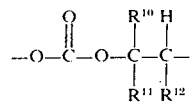

wherein $R^{10}$ and $R^{11}$ independently are H, methyl or ethyl and $R^{12}$ is —H, —NO$_2$,

—CN or —CX$_3$, X being chlorine or fluorine,
III is a divalent radical having the formula

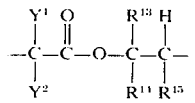

wherein $Y^1$ and $Y^2$ independently are H or Cl, $R^{13}$ and $R^{14}$ independently are H or methyl and $R^{15}$ is —H, —NO$_2$,

—CN or —CX$_3$, X being chlorine or fluorine, and
IV is a divalent radical having the formula

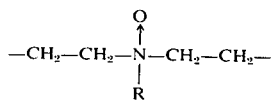

wherein $R = CH_3$ or $C_2H_5$.

3. The process of claim 2 in which said heat-sensitive group is a type I divalent radical.

4. The process of claim 2 in which said heat-sensitive group is a type II divalent radical.

5. The process of claim 1 in which said solid polymer constitutes a shaped member of an article of manufacture.

6. The process of claim 5 including as an additional step forming the shaped member.

7. The process of claim 6 in which the shaped member is formed by disposing and shaping the uncured resin in place in said article and then curing it.

8. The process of claim 5 in which the article of manufacture comprises other elements in addition to the polymeric solid and the flowable composition resulting from the degradation of the solid is dissolved in a non-solvent for said other members and separated therefrom.

9. The process of claim 7 in which the article of manufacture is a munitions charge and the shaped member is a binder resin.

10. A flowable composition produced by the process of claim 1.

* * * * *

UNITED STATES PATENT AND TRADEMARK OFFICE
CERTIFICATE OF CORRECTION

PATENT NO. : 3,909,497
DATED : September 30, 1975
INVENTOR(S) : HENDRY, Dale G. et al It is certified that error appears in the above-identified patent and that said Letters Patent are hereby corrected as shown below:

Column 21, line 33, cancel "SOCl", and in lieu thereof insert --be--.

Same column, line 46, cancel "an", and in lieu thereof insert --as--.

Columns 31 and 32, the 3-line formula following line 5, cancel the arrow running downwardly from ABIB to TDI. Instead, show the arrow as running to TDI, second occurrence, in the middle line of the formula, the corrected formula being as follows:

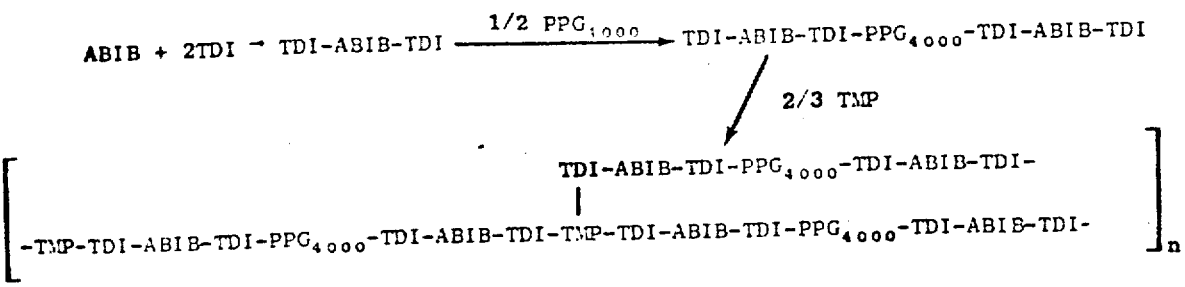

In column 34, line 30, remove the large brackets and everything in between them.

Signed and Sealed this thirtieth Day of March 1976

[SEAL]

Attest:

RUTH C. MASON
Attesting Officer

C. MARSHALL DANN
Commissioner of Patents and Trademarks